Oct. 5, 1937.   E. E. HOLT   2,094,656
ELECTRIC LIGHT FIXTURE
Original Filed March 25, 1936
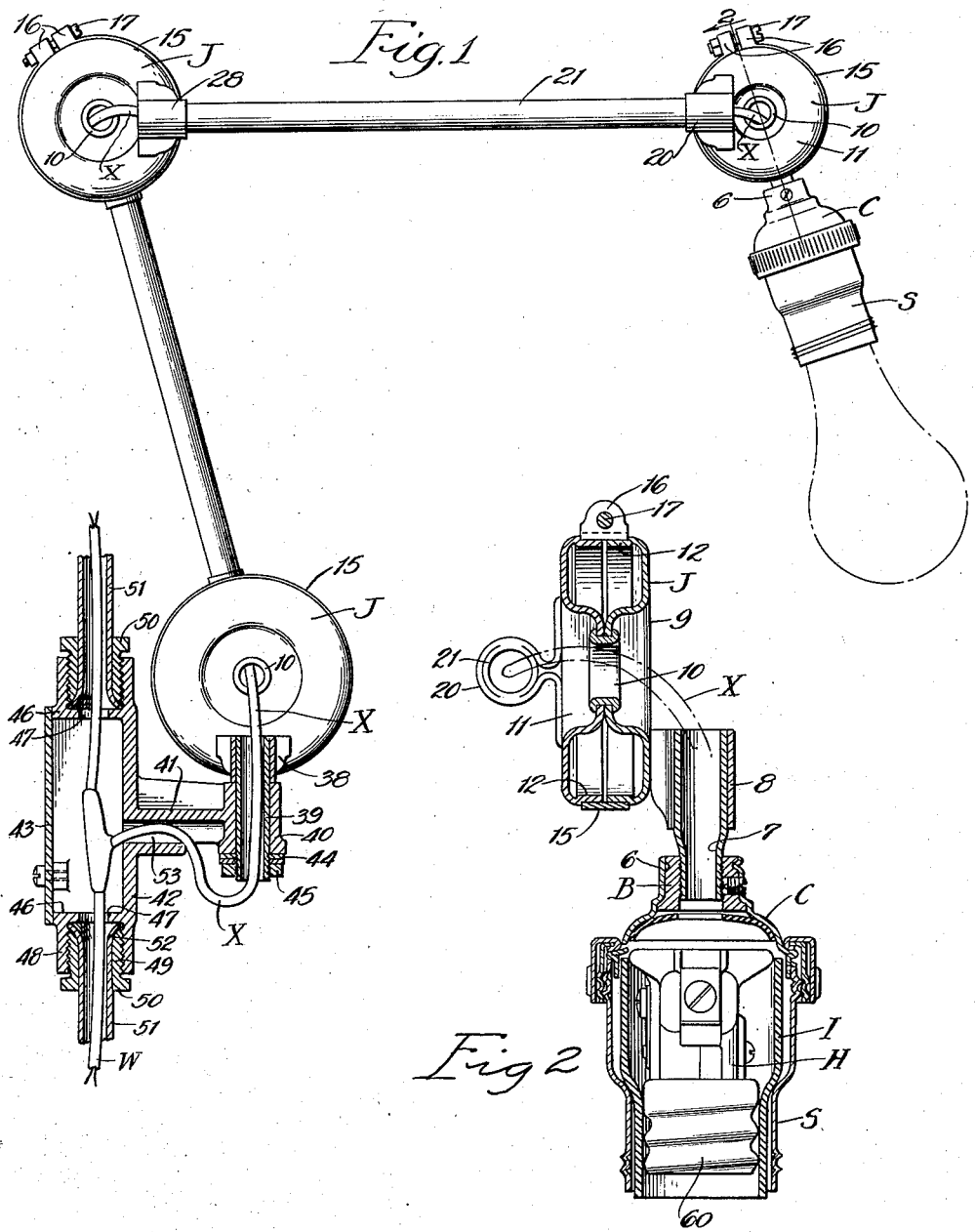
Inventor
Edward E. Holt, Patented Oct. 5, 1937

2,094,656

UNITED STATES PATENT OFFICE 2,094,656

ELECTRIC LIGHT FIXTURE

Edward E. Holt, Chicago, Ill.

Original application March 25, 1936, Serial No. 70,772. Divided and this application August 13, 1936, Serial No. 95,748

2 Claims. (Cl. 287—14)

This invention relates to an electric light fixture which is adjustable so as to enable the user to position the light at various places according to the requirements of his work. A fixture of this kind is particularly suitable for use in manufactories, or in laboratories where it is important that the light should be brought to the most advantageous position. A disclosure of the present invention was first made in my pending application, Serial No. 70,722, filed March 25, 1936, of which this case is a division.

For its objects my invention is concerned with a simplified connection between a conduit tube and an outlet box from which is extended a bracket for supporting the fixture; and with friction joints between the several sections forming the adjustable fixture arm. All this is accomplished in a manner that is inexpensive and dependable.

An exemplification of my invention is set forth in the accompanying drawing wherein:

Figure 1 is a view in elevation of my adjustable light fixture supported upon a bracket carried by an outlet box, the latter part being shown in section; and Fig. 2 is an enlarged detail in section of the friction joint proximate to the socket, taken on line 2 of Fig. 1.

As shown, the socket comprises a shell S to which is connected a domed cap C from which rises a nipple 6 wherein is fitted a bushing B interiorly threaded for connection with a short tubular section 7. Such a section may be extended from a bracket 8 having a mounting at one side of a circular disk 9 pivotally joined as by a hollow rivet 10 with a complementary disk 11 forming part of a friction joint J. The two disks which are co-radial are spaced apart near their peripheries where inset flanges 12 extend toward each other, nearly meeting centrally, as shown best in Fig. 2. Within the peripheral channel thus formed is extended a band 15 whose two ends 16 are joined, adjustably if desired as by a bolt 17, so as to apply to the disks a desired friction which will prevent free turning movement therebetween.

The complementary disk 11 is provided with a bracket 20 joined to one end of a tubular section 21 whose opposite end is connected to a bracket 28 having connection with another friction joint J which may comprise complementary circular disks the same as already described. The number of joints with associated tubular sections may be increased as desired, so that further description of such duplicate parts is unnecessary. The joint adjacent the base whereon the fixture is supported is provided with a bracket 38 from which depends a short tubular section 39 having a rotatable mounting in a bearing 40 that is formed at one end of a bracket 41 which extends laterally from an elongated outlet box 42 having a side opening with a removable cover plate 43. The tubular section 39 is secured against removal from the bearing 40 as by means of washers 44 and a lock nut 45.

The outlet box is provided with end walls 46, in each of which is an opening 47 with a surrounding outwardly extending nipple 48 internally threaded to receive a hollow nut or plug 49 having a polygonal head 50. Through the plug is extended a conduit 51 whose end is outwardly flared as at 52, the interior of the plug being tapered somewhat in conformity therewith. When the plug is screwed home, the conduit is wedged tightly in place against the end wall of the outlet box so as to be firmly connected therewith. A similar construction may be employed at each end of the box, permitting wiring W to be extended therethrough and through the conduits, with a connection X from the outlet box through an opening 53 adjacent the bracket 41 extending through the tubular section 39 and the various sections of the adjustable fixture to the socket S.

The socket is provided interiorly with the usual insulation I surrounding a threaded collar 60 into which the threaded neck of a light bulb may be secured, also with an insulated head H in connection therewith to which the wires may be joined in the usual way.

I claim:

1. In combination with a pair of sections comprised in a lighting fixture arm, a swivel joint between the two sections, the joint consisting of two complementary circular disks one connected to each section, each disk being formed to abut the other in its axial region and being spaced from the other adjacent its periphery where it is provided with an inset flange extending toward the other to terminate just short of mutual engagement, a pivotal axial connection between the two disks, and a friction band extending around within the channel afforded by the inset peripheral flanges of the disks adapted to occupy a selected circumferential position thereupon while opposing with equal force in either direction a rotary movement of one disk with respect to the other.

2. In combination with a pair of sections comprised in a lighting fixture arm, a swivel joint between the two sections, the joint consisting of two complementary circular disks one connected to each section, each disk being formed to engage the other only in its axial region and being spaced from the other adjacent its periphery where it is provided with a flange extending toward the other to terminate just short of mutual engagement, a pivotal axial connection between the two disks, a friction band extending around the peripheral flanges of the two disks adapted to occupy a selected circumferential position thereupon, and means for tightening the band to apply a desired degree of friction in a radial direction only to the peripheries of the two disks whereby to oppose with equal force in either direction a rotary movement of one disk with respect to the other.

EDWARD E. HOLT.